United States Patent Office 3,485,843
Patented Dec. 23, 1969

3,485,843
PIPERAZINE ADDUCTS OF KETONE
MERCAPTOLES
Samuel S. M. Wang, Indianapolis, Ind., assignor to The
Dow Chemical Company, Midland, Mich., a corporation of Delaware
No Drawing. Filed May 11, 1967, Ser. No. 637,634
Int. Cl. C07d 51/70; A61k 27/00
U.S. Cl. 260—268                          2 Claims

ABSTRACT OF THE DISCLOSURE

Novel piperazine adducts of ketone mercaptoles, for example, the piperazine adduct of bis(3,5-di-tert-butyl-4-hydroxyphenyl) acetone mercaptole, which compounds are active as hypocholesteremic agents.

---

This invention relates to piperazine adducts of ketone mercaptole compounds and is particularly directed to piperazine adducts of bis(3,5-dialkyl-4-hydroxyphenyl) ketone mercaptole compounds corresponding to the formula:

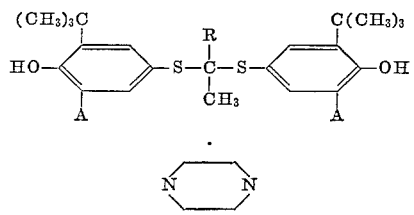

In the present specification and claims, R and A each independently represent lower alkyl groups containing from 1, to 2, to 3, to 4 carbon atoms, inclusive. The novel piperazine adducts can be described as piperazine complexes of ketone mercaptoles wherein the piperazine and the ketone mercaptole are present in equal proportions on a molecular basis. The novel adducts are crystalline solids which are of varying degrees of solubility in organic solvents such as ether, acetone and alcohols and which are slightly soluble in water.

The piperazine adducts of ketone mercaptoles have been found to be useful for administration to laboratory animals in the study of sterol metabolism therein. They have been found to be particularly useful as hypocholesteremic agents.

The novel adducts are conveniently prepared by mixing a substituted ketone mercaptole compound with an excess of piperazine in an inert organic solvent such as acetone or ethanol. The product is formed when the starting materials are mixed together, preferably at temperatures from about 25°–50° C. The product precipitates from the mixture on cooling and can be separated by such conventional procedures as filtration and centrifugation. The product can be purified by conventional procedures such as washing and recrystallization.

The substituted ketone mercaptoles which are employed as starting materials herein are prepared by the reaction of a ketone containing from 3 to 6 carbon atoms with a suitable substituted 4-mercaptophenol. In a convenient procedure, the substituted 4-mercaptophenol is heated under reflux with a ketone, as described above, under an inert atmosphere and in an organic solvent such as methanol. The substituted ketone mercaptole precipitates during the reaction and the product can be separated by such conventional procedures as filtration or centrifugation. The substituted ketone mercaptole can be purified by conventional procedures such as washing and recrystallization.

In preparing the novel piperazine adducts of the substituted ketone mercaptole compounds, a warm solution of a substituted ketone mercaptole is mixed with an excess of piperazine in warm inert organic solvent such as acetone or ethanol. The piperazine is preferably employed in a ratio of about 4–8 molar proportions of piperazine for each molar proportion of the substituted ketone mercaptole. The formation of the product is generally complete within a few minutes. The product precipitates from the mixture on cooling and can be conveniently separated by filtration and purified by washing with cold acetone.

The following examples illustrate the invention but are not to be construed as limiting the same.

EXAMPLE 1

Bis(3,5 - di-tert-butyl-4-hydroxyphenyl) acetone mercaptole (4.6 grams; 0.01 mole) was dissolved in 30 milliliters of acetone with stirring. A warm solution of piperazine (2.3 grams; 0.04 mole) in 30 milliliters of acetone was added slowly to the solution. The mixture was cooled slowly in an ice water bath and a precipitate formed. The cooled mixture was filtered and the filter cake was washed with 20 milliliters of acetone and dried at 50° C. The piperazine adduct of bis(3,5-di-tert-butyl-4-hydroxyphenyl) acetone mercaptole was recrystallized from ethanol and found to melt at 143°–145° C. The product was found by analysis to have carbon, hydrogen and nitrogen contents of 69.89, 9.69 and 4.35 percent, respectively, as compared with the theoretical contents of 69.71, 9.69 and 4.65 percent, respectively, calculated for the named structure.

EXAMPLE 2

Bis(3,5 - di-tert-butyl-4-hydroxyphenyl) butanone mercaptole (1 gram; 0.002 mole) was dissolved in 5 milliliters of acetone with stirring. A warm solution of piperazine (1 gram; 0.016 mole) in 10 milliliters of acetone was added slowly to the solution. The mixture was cooled and held in the refrigerator for 36 hours and a white precipitate formed. The cooled mixture was filtered and the filter cake was washed with cold acetone. The filter cake was mixed with 10 milliliters of cold acetone and the mixture was filtered. The piperazine adduct of bis(3,5-di-tert-butyl-4-hydroxyphenyl) butanone mercaptole product was found to melt at 138°–140° C. The structure of the product was confirmed by infrared spectroscopy.

EXAMPLE 3

Bis(3 - tert - butyl - 4-hydroxy-5-methylphenyl) acetone mercaptole (1 gram; 0.002 mole) was dissolved in 5 milliliters of acetone with stirring. A warm solution of piperazine (1 gram; 0.016 mole) in 10 milliliters of acetone was added slowly to the solution. The mixture was cooled and a precipitate formed on standing. The cooled mixture was filtered and the filter cake was washed twice with cold acetone and dried. The piperazine adduct of bis(3 - tert - butyl - 4-hydroxy-5-methylphenyl) acetone mercaptole product was found to melt at 142°–144° C.

In substantially the same procedure, the piperazine adduct of bis(3 - tert -butyl - 5-ethyl-4-hydroxyphenyl) acetone mercaptole, having a molecular weight of 547, is prepared by mixing bis(3 - tert - butyl - 5-ethyl-4-hydroxyphenyl) acetone mercaptole with excess piperazine.

EXAMPLE 4

Bis(3,5 - di - tert - butyl-4-hydroxyphenyl) pentanone mercaptole (1 gram; 0.002 mole) was dissolved in 5 milliliters of acetone with stirring. A warm solution of piperazine (1 gram; 0.016 mole) in 10 milliliters of acetone was added slowly to the solution. The mixture was cooled and a precipitate formed. The cooled mixture was filtered and the filter cake was washed twice with cold acetone. The piperazine adduct of bis(3,5 - di - tert - butyl-4-hydroxyphenyl) pentanone mercaptole product was found to melt at 126°–129° C. The structure of the product was confirmed by infrared spectroscopy.

EXAMPLE 5

One gram of bis(3,5-di-tert-butyl-4-hydroxyphenyl) hexanone mercaptole was dissolved in 5 milliliters of acetone and a solution of one gram of piperazine in 10 milliliters of warm acetone was added slowly to the solution. The mixture was cooled slowly and held for 36 hours in a refrigerator. A white crystalline precipitate formed. The cooled mixture was filtered and the filter cake was washed twice with ice cold acetone and dried. The piperazine adduct of bis(3,5-di-tert-butyl-4-hydroxyphenyl) hexanone mercaptole product was found to melt at 161°–163° C.

EXAMPLE 6

Bis(3-tert-butyl-4-hydroxy-5-isopropylphenyl) acetone mercaptole (1 gram) was dissolved in 5 milliliters of acetone with stirring. A warm solution of piperazine (1 gram) in 10 milliliters of acetone was added slowly to the solution. The mixture was cooled and held for 1.5 days in a refrigerator during which time a precipitate formed. The cooled mixture was filtered and the filter cake was washed twice with cold acetone. The piperazine adduct of bis(3-tert-butyl-4-hydroxy-5-isopropylphenyl) acetone mercaptole product was found to melt at 154°–156° C. The structure of the product was confirmed by infrared spectroscopy.

The novel compounds are useful as hypocholesteremic agents, that is, the compounds, when administered internally to animals, and particularly to mammals, have the effect of lowering the serum cholesterol content of the animal. The novel compounds have low toxicity and have no significant pharmacological effects in other areas and have no significant estrogenic effect. The compounds can be administered orally as compositions in the form of tablets, capsules, emulsions, suspensions or the like. They can also be formulated as nutritive compositions adapted to be administered as all or part of the animal diet. The compounds can also be administered by injection in the form of sterile injectable solutions or suspensions. Substantial lowering of serum cholesterol levels is obtained when the novel compounds are administered at dosage rates from about 200 to about 4000 milligrams per kilogram per day.

In a representative operation, a feed composition consisting of balanced rodent feed was mixed together with the piperazine adduct of bis(3,5-di-tert-butyl-4-hydroxyphenyl) acetone mercaptole to prepare a composition containing the named compound in the amount of 0.06 percent. Six male mice were fed for two weeks on a diet consisting of the above-described composition. A separate group of mice was fed for two weeks on a similar diet which contained none of the test compound to serve as a check. At the end of the two week period, the mice were exsanguinated under ether anesthesia. Serum cholesterol was determined by the method of Henly, The Anaylst, vol. 82, pp. 286–7 (1957) using an aliquot of serum from each mouse. The serum cholesterol level of the mice administered the piperazine adduct of bis(3,5-di-tert-butyl-4-hydroxyphenyl) acetone mercaptole was found to be 39 percent lower than the serum cholesterol content of the mice in the check group.

I claim:

1. A compound corresponding to the formula

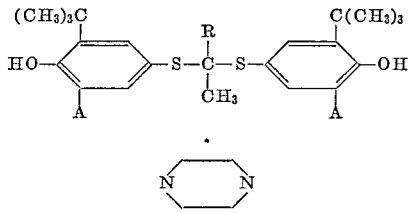

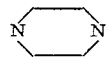

wherein R and A each independently represent a lower alkyl group containing from 1–4 carbon atoms, inclusive.

2. The compound of claim 1 wherein the compound is the piperazine adduct of bis(3,5-di-tert-butyl-4-hydroxyphenyl) acetone mercaptole.

References Cited

UNITED STATES PATENTS

| | | | |
|---|---|---|---|
| 2,980,681 | 4/1961 | Short | 260—268 |
| 3,203,858 | 8/1965 | Buting | 260—268 X |
| 3,310,587 | 3/1967 | O'Shea | 260—609 |

DONALD G. DAUS, Primary Examiner

U.S. Cl. X.R.

260—609; 424—250, 337